United States Patent
Oren et al.

(10) Patent No.: US 10,509,892 B2
(45) Date of Patent: Dec. 17, 2019

(54) ACOUSTIC SECURITY CODE TRANSMISSION

(71) Applicant: B. G. Negev Technologies and Applications Ltd., at Ben-Gurion University, Beer Sheva (IL)

(72) Inventors: Yossi Oren, Rehovot (IL); Asaf Grosz, Ramat-Gan (IL); Nir Hasidim, Kibbutz Nirim (IL); Benyamin Farshteindiker, Beer Sheva (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 203 days.

(21) Appl. No.: 15/645,111

(22) Filed: Jul. 10, 2017

(65) Prior Publication Data
US 2018/0011999 A1     Jan. 11, 2018

Related U.S. Application Data

(60) Provisional application No. 62/360,395, filed on Jul. 10, 2016.

(51) Int. Cl.
| | |
|---|---|
| G06F 21/42 | (2013.01) |
| G06F 21/30 | (2013.01) |
| G08C 23/02 | (2006.01) |
| G10L 19/018 | (2013.01) |
| G06F 21/35 | (2013.01) |

(52) U.S. Cl.
CPC ............ *G06F 21/305* (2013.01); *G06F 21/35* (2013.01); *G08C 23/02* (2013.01); *G10L 19/018* (2013.01)

(58) Field of Classification Search
None
See application file for complete search history.

(56) References Cited

U.S. PATENT DOCUMENTS

| | | | | |
|---|---|---|---|---|
| 8,391,480 | B2 * | 3/2013 | Steenstra | G06Q 20/3272 380/277 |
| 9,332,008 | B2 * | 5/2016 | Burch | H04L 63/0838 |
| 9,584,356 | B2 * | 2/2017 | Gressus | H04L 63/0853 |
| 2013/0244591 | A1 * | 9/2013 | Weissman | H03H 9/462 455/77 |
| 2015/0263688 | A1 * | 9/2015 | Nicolino, Jr. | H03G 3/32 381/57 |

* cited by examiner

*Primary Examiner* — Fatoumata Traore
(74) *Attorney, Agent, or Firm* — Browdy and Neimark, P.L.L.C.

(57) ABSTRACT

A system and methods of computer security are provided wherein a first mobile computing device drives an acoustic transducer to emit an acoustic signal encoding a time-based, one time password (TOTP) code, and a second mobile computing device measures output of a MEMS gyroscope that senses the emitted acoustic signal. The second mobile computing device decodes the TOTP code from the gyroscope output, validates the TOTP code and responsively permits a user to access a secure application.

7 Claims, 3 Drawing Sheets

Time

ACOUSTIC SECURITY CODE TRANSMISSION

RELATED APPLICATION DATA

This application claims the benefit of Provisional Patent Application 62/360,395, filed Jul. 10, 2016, which is incorporated herein by reference.

FIELD OF THE INVENTION

The present invention is directed to systems and methods for signal transmission and, in particular, acoustic signal transmission.

BACKGROUND

A time-based one-time password (TOTP) is a code that is generally computed from a shared secret key and a current time. Internet Engineering Task Force standard RFC 6238, whose disclosure is incorporated herein by reference, is a TOTP standard used in a number of two-factor authentication systems. In a TOTP system, users are typically given a small mobile device, called a TOTP token, which displays a constantly changing TOTP code. To gain access to a system or application secured by TOTP, a user enters into the system the TOTP code shown at a given moment on the TOTP token. A TOTP system is also described in U.S. Pat. No. 4,720,860, whose disclosure is incorporated herein by reference.

The requirement to manually copy a TOTP code from the token is a cause for user errors and frustration. In addition, the digits displayed by the token must be large to be read by human users, which constrains the minimum size of the token and exposes the scheme to snooping attacks, as the token may be visible to people or to hidden cameras in the user's vicinity.

SUMMARY

Embodiments of the present invention provide a system and methods by which a TOTP code is transmitted acoustically from a token to a secure application running on a mobile device incorporating a MEMS gyroscope. Each pulse is emitted at an acoustic frequency that causes interference in the operation of the MEMS gyroscope on the mobile device. The interference is measured and decoded to give the original TOTP code.

In particular, embodiments of the present invention provide a method of computer security including driving an acoustic transducer in a first mobile computing device to emit an acoustic signal encoding a time-based, one time password (TOTP) code; measuring output of a microelectromechanical system (MEMS) gyroscope sensing the emitted acoustic signal in a second mobile computing device; decoding the TOTP code from the MEMS gyroscope output; validating the TOTP code; and responsively permitting a user to access a secure application.

In some embodiments, the acoustic transducer encodes the TOTP by varying the amplitude of the acoustic signal, and the acoustic signal has a frequency approximately equal to a resonant frequency of the MEMS gyroscope. Measuring the output of the MEMS gyroscope may include measuring noise variations in the output. Validating the TOTP code may include transmitting the TOTP code to a TOTP validation server and receiving an authorization from the validation server. In addition, the secure application may run on the second mobile device. Alternatively, the secure application may run on a server communicatively coupled by wireless means to the second mobile device and the measurement of the output of the MEMS gyroscope may be performed by a front-end application running on the second mobile device.

In some embodiments, the frequency of the emitted acoustic signal may be set to optimize the level of noise in the MEMS gyroscope that is caused by the acoustic signal.

Further embodiments of the present invention provide a system that includes: a first mobile computing device configured to generate a time-based, one time password (TOTP) code and to emit an acoustic signal encoding the TOTP code; and a second mobile computing device including a microelectromechanical system (MEMS) gyroscope configured as a motion sensor, the second mobile computing device further configured to measuring output of the MEMS gyroscope, to decode the TOTP code from the gyroscope output, to validate the TOTP code, and responsively to permit a user to access a secure application.

The present invention will be more fully understood from the following detailed description of embodiments thereof.

BRIEF DESCRIPTION OF DRAWINGS

The accompanying drawings illustrate embodiments of the disclosed subject matter and together with the detailed description serve to explain principles of these embodiments. Structural details are shown only as needed for a fundamental understanding of the disclosed subject matter and various ways in which it may be practiced.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Figure 1:
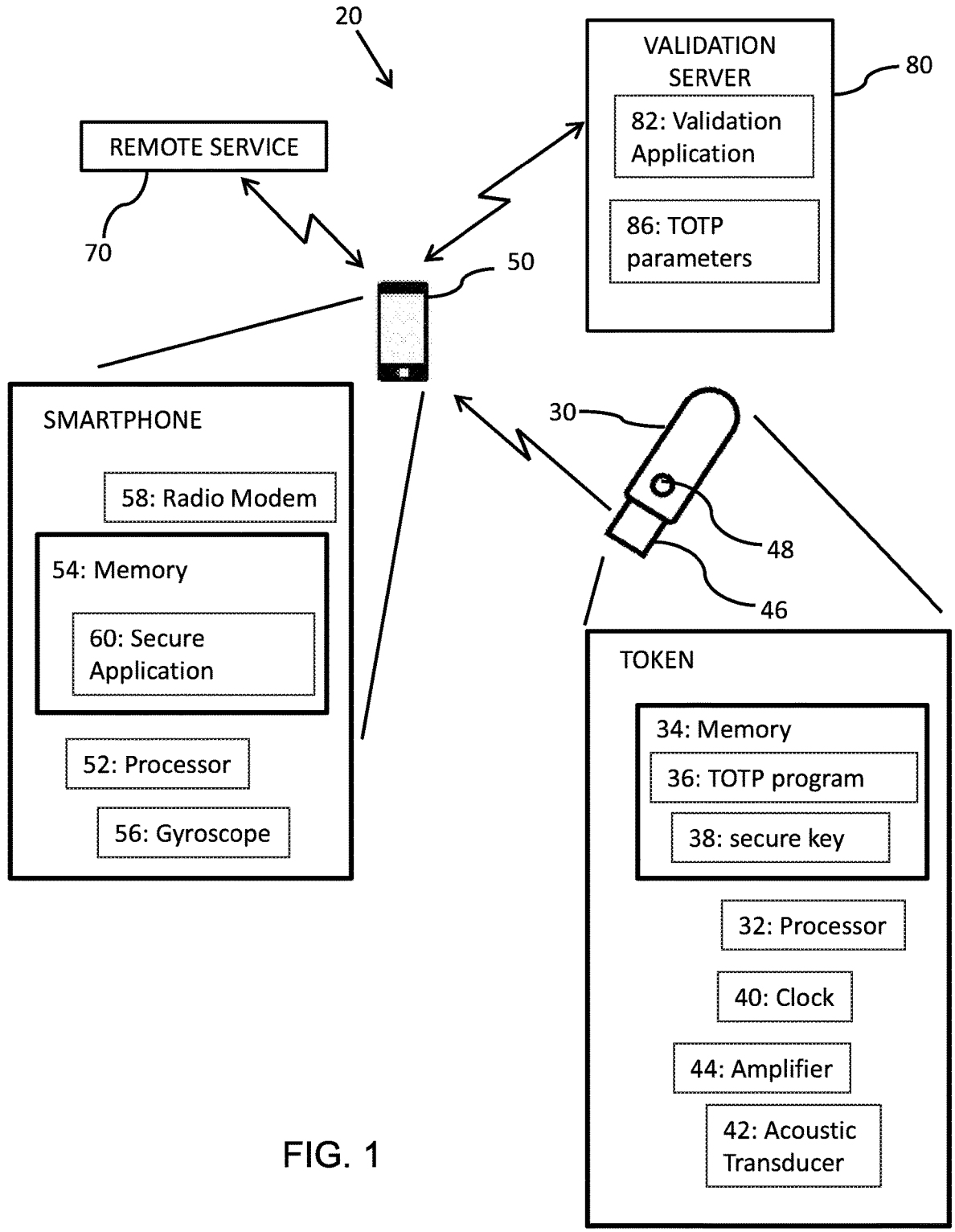
FIG. 1 is a schematic, pictorial illustration of a system for acoustic transmission of a time-based, one time password (TOTP) code, according to an embodiment of the present invention.

FIG. 1 is a schematic, pictorial illustration of a system 20 for acoustic transmission of a time-based, one time password (TOTP) code, according to an embodiment of the present invention. System 20 includes an acoustic token 30 and a mobile computing device such as a smartphone 50. The system may also include a remote server 70. The acoustic token is configured to transmit a TOTP code to the smartphone, in order to validate a user's identity and to permit the user to access a secure application 60.

The communications between the acoustic token and the smartphone frees the smartphone user from having to copy the TOTP code, reducing the possibility of user error and reducing the risk of outside snooping.

In embodiments of the present invention, the acoustic token includes a token processor 32 and token memory storage 34, the memory storage including a TOTP generator program 36. The TOTP generator program is configured to run on the processor to generate a TOTP code. Generation of the TOTP code is uniquely determined by 1) a secure key 38 (or algorithm) stored in the token memory storage and by 2) a time, which must be maintained to correspond with a time maintained by the secure application. Typically the maintenance of the time correspondence is performed by a clock 40.

After creating the TOTP code, the generator program drives an acoustic transducer 42 to emit an acoustic signal corresponding to the code. Various signaling protocols may be implemented, as described further hereinbelow with respect to FIGS. 2 and 3.

The acoustic transducer may be a small, low power speaker, preferably with a frequency response output having an upper range of 20 kHz or higher. Such speakers may be magnetic or electret speakers, or piezoelectric speakers such as an APS2509S-T-R Piezo Speaker manufactured by PUI. In typical embodiments, the acoustic signal emitted is in a frequency range close to 20 kHz and therefore beyond the hearing range of most people.

In further embodiments, both the processor and memory of the acoustic token are included in a microcontroller, such as an Atmel ATmega328P or an Intel LMCQ1000 microcontroller. To increase the power for driving the transducer signal, the acoustic token may include a signal amplifier 44, such as an MC33152PG IC driver from ON Semiconductor, a MAX9788 speaker driver from Maxim Integrated, or a 2N2222A switching transistor from Central Semiconductor Corp.

The acoustic token also typically includes additional elements, not shown, that are standard in most TOTP tokens, such as a battery to provide internal power. The token may also include a display for visually presenting a user with a TOTP code, such that the token may operate in both a visual and acoustic mode.

The acoustic token may also include a communications port, such as a USB connector 46. The communications port may provide a means for loading data and instructions, such as the TOTP generator program and the secure key, to the token memory, as well as for synchronizing the time.

In addition, the acoustic token may include a button or trigger 48. When the trigger is configured as a button, a user's pressing of the button triggers the TOTP generator program to cause the acoustic transducer to emit the acoustic signal. In some embodiments, the trigger may be pressed when held against the smartphone, or may be actuated when in proximity to the smartphone, for example by inductive or other wireless means. Other means of triggering known in the art may also be employed, such as including a motion sensor in the token, such that the TOTP generator program is triggered to transmit the acoustic signal when the token is shaken.

Smartphone 50 includes a microelectromechanical system (MEMS) gyroscope 56. Such gyroscopes can be found on virtually all mobile phones and on many other portable personal devices. Gaming applications frequently take advantage of the motion sensing capabilities of these sensors to create games with a high level of physical user interaction. MEMS gyroscopes provide output signals indicating rotational movement along axes of the gyroscope. An example of a MEMS gyroscope for smartphones is the L3G4200D digital gyroscope from STMicroelectronics. Motions that change the planar direction of the gyroscope's vibration are measured as strains imposed on the gyroscope axes.

Programmatic access to the gyroscope output is generally provided as part of development frameworks of smartphone operating systems. For example, for Android™ based smartphones, programmatic access is included in the android-.hardware software development kit (SDK). For iOS™ based smartphones, programmatic access is part of the iOS SDK. Access to the gyroscope output by a smartphone application generally requires no special operating system permission or privileges.

MEMS gyroscopes that are commonly used in smartphones and other mobile devices are susceptible to the effects of external acoustic noise, especially when that noise is at or near a resonant vibrational frequency of the gyroscope. Such frequencies are typically in a range of 3 kHz to 20 kHz. Such noise can disrupt gyroscope operation, causing the output to be unreliable. The phenomenon of acoustic interference is discussed in detail by, for example, Yunker, et al., J. Appl. Phys. V. 113, Issue 2, 2013.

The smartphone also includes a smartphone processor 52 and memory storage 54, the memory storage including secure application 60 configured to run on the processor. Typically the processor and memory storage are included in a single memory controller.

In further embodiments, the secure application is a distributed application, with most functionality of the application running on the remote server 70, and a front-end of the application, such as a web page or smartphone "app", runs on the smartphone. The smartphone may communicate in a wireless manner with remote services on the remote server by means of a radio modem 58. Modern smartphones typically support multiple wireless communication protocols, including cellular and WiFi protocols, as well as means for encrypting such communications.

In embodiments of the present invention, the secure application, upon execution by the user, begins to measure output of the gyroscope. The secure application may also provide an instruction to the user to place the token on the smartphone or otherwise bring the token in proximity to the smartphone. In alternative or additional embodiments, the secure application may also instruct the user to trigger the token, for example by pressing the button of the token.

The acoustic pulses emitted by the token's acoustic transducer cause a pattern of disturbances in the gyroscope output, that is, a pattern of successive increases and decreases in the level of signal noise, as indicated hereinbelow with respect to FIG. 4. The pattern of noise is decoded by the secure application to extract the TOTP code.

The secure application may then transmit the TOTP code to a validation application 82 on a validation server 80. The validation application is programmed to generate a TOTP from the same TOTP parameters 86 used by the token, that is, the validation application is configured (generally for each token of each individual user) to maintain the same secret key, the same manner of determining the current time, the same cryptographic hash method, and the same TOTP numerical length (the default being six digits). The validation application validates the TOTP code by generating a new TOTP code and validating that the two TOTP codes match, or are reasonably close, given that the random noise in the received TOTP signal may prevent a perfect decoding of the original TOTP code. A match, or reasonably close statistical match, confirms the identity of the user who has possession of the acoustic token. Typically the validation server is a standard computing device including memory storage, one or more processors, means of communications, as well as a clock, which facilitates maintaining the measurement of time incorporated into the algorithm for determining the TOTP code.

Upon validation of the TOTP code, the secure application permits the user to access further functions of the application.

The secure application may also be configured to transmit the raw gyroscope output to the validation program, which may decode the TOTP code from the gyroscope signal noise and then perform TOTP validation. In alternative embodiments, the validation application may run on the smartphone or on the remote server.

Figure 2:
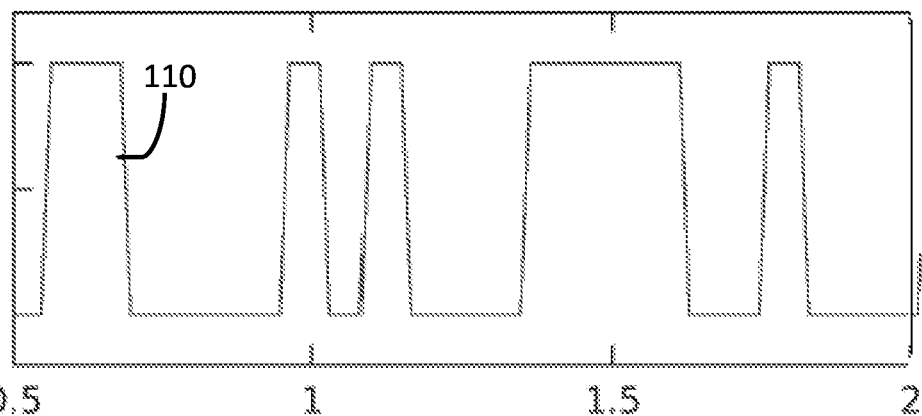
FIG. 2 is a graph of a binary sequence representing a TOTP code, according to an embodiment of the present invention.

FIG. 2 is a graph of a binary sequence 110 representing a TOTP code, according to an embodiment of the present invention. In one embodiment, the TOTP code is represented as a binary code, which may also include additional features, such as a header and error parity. For asynchronous transmission, the TOTP code may be encoded as an isochronous self-clocking signal, such as a Manchester code. In further embodiments, the TOTP code may be encoded in binary, ternary, quaternion or higher degree formats. Typically the rate of transmission of the TOTP code is set at less than 1 second.

Figure 3:
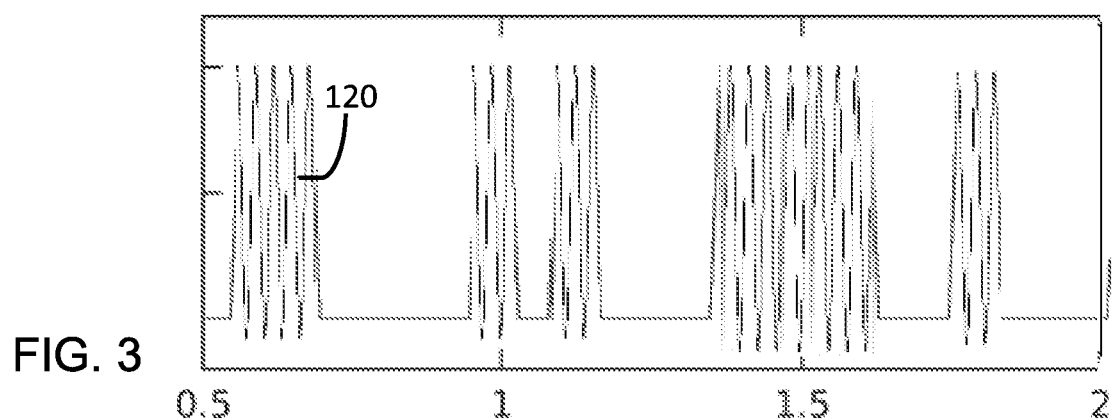
FIG. 3 is a graph of a sequence of acoustic pulses representing a TOTP code, according to an embodiment of the present invention.

FIG. 3 is a graph of a sequence of acoustic pulses 120 representing the TOTP code, according to an embodiment of the present invention. The acoustic pulses correspond to the form of the TOTP encoding shown in FIG. 2. That is, high levels of the TOTP binary code, representing "1" bits, are emitted as acoustic pulses. Low levels are represented as periods of silence. In other words, the acoustic signal is modulated as "on" and "off" pulses. Alternatively, the bits of acoustic signal may be modulated to represent the TOTP code as binary shifts between high and low amplitude transmissions. As described above, the acoustic pulses are typically in a frequency range near 20 kHz. In some embodiments, the pulses are in a frequency range above 15 kHz, that is, above the hearing range of most users, which may reduce the annoyance of high frequency sounds for those users. In further embodiments, tokens are configured to more specifically provide optimal frequencies according to the type of MEMS gyroscope installed in the user's smartphone.

Figure 4:
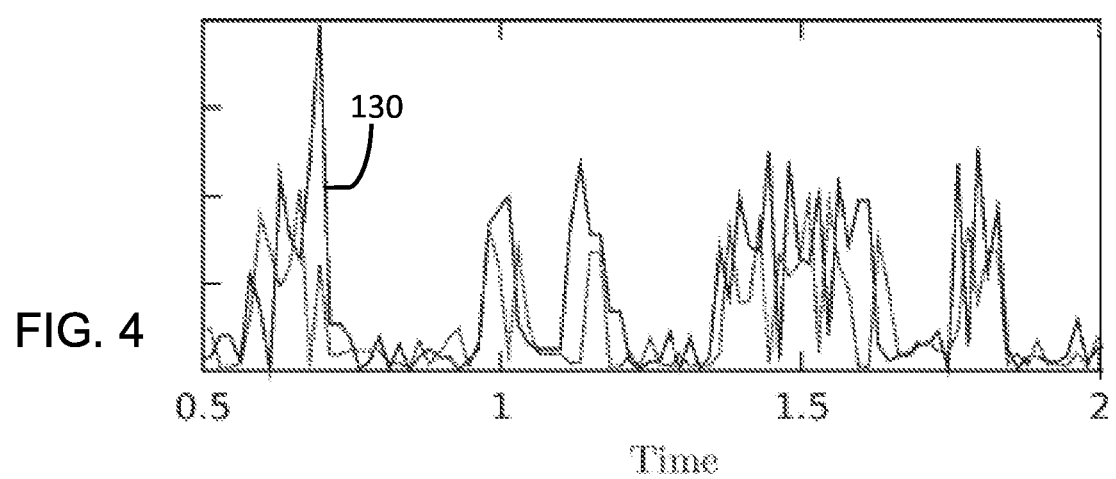
FIG. 4 is a graph of output of a MEMS gyroscope, including noise caused by acoustic pulses, according to an embodiment of the present invention.

FIG. 4 is a graph of output of a MEMS gyroscope, including a sequence of signal noise variations 130 caused by acoustic pulses, according to an embodiment of the present invention. As indicated, the high amplitude acoustic pulses shown in FIG. 3 cause high levels of noise in the output of the gyroscope. Typical smartphones include at least two gyroscopes, to indicate orthogonal rotational motion. FIG. 4 shows the output of two gyroscopes, one output indicated as a solid line, and the other as a dotted line. The combined data from both gyroscopes more accurately indicates the extent of each acoustic pulse.

Figure 5:
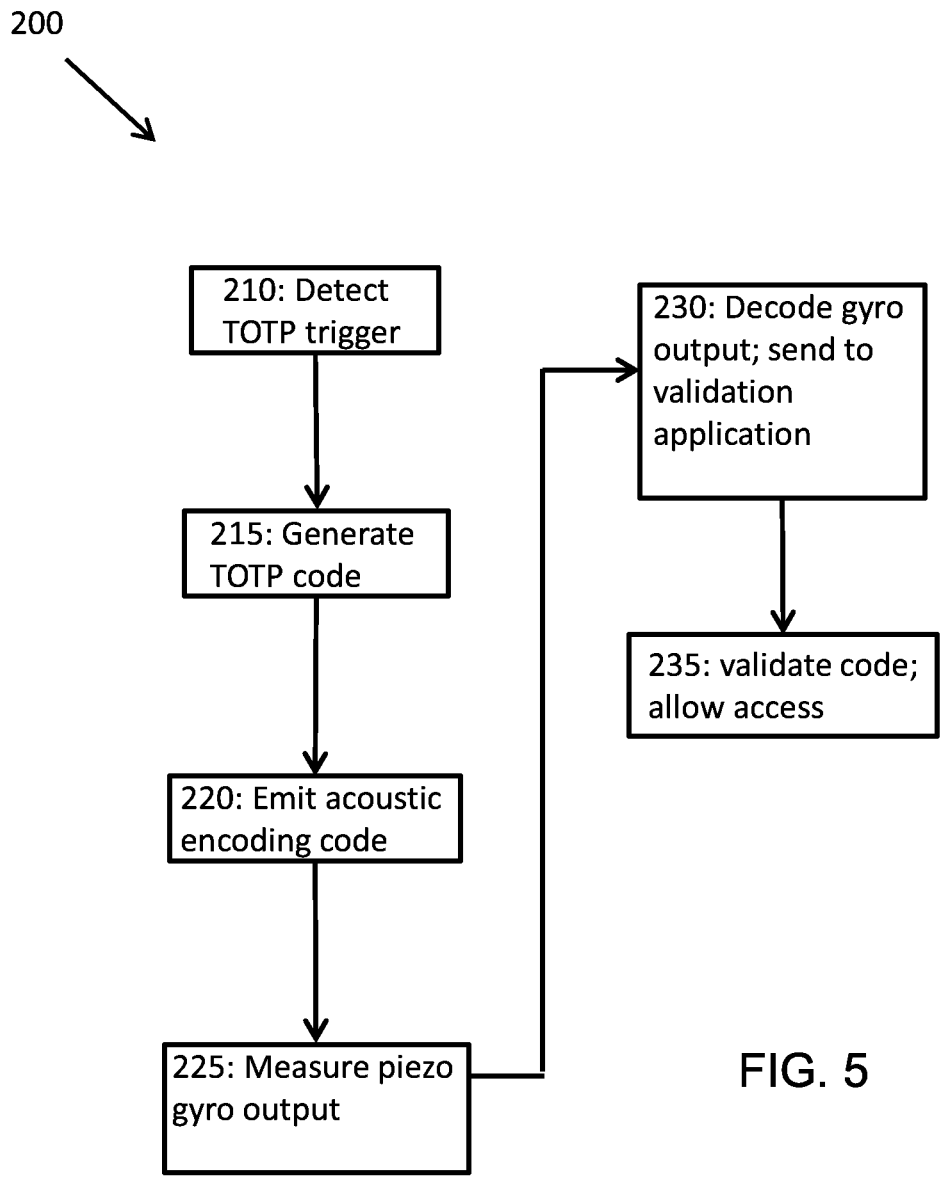
FIG. 5 is a flow diagram of a process for acoustic transmission of a TOTP code, according to an embodiment of the present invention.

FIG. 5 is a flow diagram of a process 200 for acoustic transmission of a time-based, one time password (TOTP), according to an embodiment of the present invention. As described above, with respect to FIG. 1, the process is implemented by two or three separate computing devices or systems.

At a step 210, a first mobile computing device, that is, an acoustic token described above, detects a TOTP trigger indicating that a user wants to perform TOTP authentication. As described above, the trigger may be the pressing of a button on the acoustic token, or a sensor of the token detecting proximity to a second mobile computing device, such as a smartphone. During the process of transmission and validation of the TOTP code, a secure application may display on a screen of the smartphone an indication of the progress of the process, showing, for example, an indicator of the volume of the acoustic signal and an estimate of the percent of the process completed.

In response to the trigger, the acoustic token generates a TOTP code at a step 215 and then emits this signal from the acoustic transducer at a step 220. In alternative embodiments, in which the acoustic token is also a standard token with a display, the TOTP code may be generated continuously, and the purpose of the trigger is to initiate emission of the acoustic signal.

The emitted acoustic signal interferes with the operation of a MEMS gyroscope in a second mobile computing device, such as a smartphone. A secure application running on the smartphone measures the output of the gyroscope at a step 225.

At a step 230, the secure application decodes the TOTP code by determining the changes in levels of noise in the gyroscope output, for example by a threshold decoder, or other AM demodulation methods known in the art. The noise threshold levels are decoded into bits of the TOTP code. The secure application may then send the code to a remote validation application.

At a step 235, the validation application performs validation by generating a new TOTP code and comparing it to the received TOTP code. If there is a match, or reasonably close match as described above, the validation application returns a validation message to allow access. As described above, in alternative embodiments the secure application may perform the validation, or may transmit the gyroscope output to the validation application. If the validation is not successful, the process may be repeated one or more times.

It should be noted that no hardware or operating system changes need to be made to most deployed smartphones in order to enable the functionality of process 200. In addition, because the secure application measures the gyroscope output, rather than the smartphone microphone, the microphone is available for other applications that may operate simultaneously. Use of the microphone may be a fallback in environments with high levels of vibration.

Processing elements of system 20 and of process 200 can be implemented in digital electronic circuitry, or in computer hardware, firmware, software, or in combinations thereof. Such elements can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media. Examples of storage media include, but are not limited to, magnetic media, optical media, and integrated circuits such as read-only memory devices (ROM) and random access memory (RAM). Each processing device in the system may have one or more processors and may be configured as a multi-processing or distributed processing unit.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A method of computer security comprising:
    driving an acoustic transducer in a first mobile computing device to emit an acoustic signal that encodes a time-based, one time password (TOTP) by varying the amplitude of the acoustic signal, wherein the acoustic signal has a frequency approximately equal to a resonant frequency of a microelectromechanical system (MEMS) gyroscope of a second mobile computing device;
    measuring output of a the MEMS gyroscope sensing the emitted acoustic signal in the second mobile computing device;
    decoding the TOTP from the MEMS gyroscope output;
    validating the TOTP; and
    responsively permitting a user to access a secure application.

2. The method of claim 1, wherein measuring the output of the MEMS gyroscope comprises measuring noise variations in the output.

3. The method of claim 1, wherein validating the TOTP comprises transmitting the TOTP to a TOTP validation server and receiving an authorization from the validation server.

4. The method of claim 1, wherein the secure application runs on the second mobile device.

5. The method of claim 1, wherein the secure application runs on a server communicatively coupled by wireless means to the second mobile device and wherein the measurement of the output of the MEMS gyroscope is performed by a front-end application running on the second mobile device.

6. The method of claim 1, wherein the frequency of the emitted acoustic signal is set to optimize the level of noise in the MEMS gyroscope that is caused by the acoustic signal.

7. A computer system comprising:
    a first mobile computing device configured to generate a time-based, one time password (TOTP) and to emit an acoustic signal that encodes the TOTP by varying the amplitude of the acoustic signal, wherein the acoustic signal has a frequency approximately equal to a resonant frequency of a microelectromechanical system (MEMS) gyroscope of a second mobile computing device; and
    the second mobile computing device including the MEMS gyroscope configured as a motion sensor, the second mobile computing device further configured to measure output of the MEMS gyroscope, to decode the TOTP from the gyroscope output, to validate the TOTP, and responsively to permit a user to access a secure application.

* * * * *